United States Patent
Ah

(10) Patent No.: US 9,933,128 B2
(45) Date of Patent: Apr. 3, 2018

(54) LAMP APPARATUS FOR AUTOMOBILE

(71) Applicant: HYUNDAI MOBIS Co., Ltd., Yongin-si, Gyeonggi-do (KR)

(72) Inventor: Sang Min Ah, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 43 days.

(21) Appl. No.: 15/051,979

(22) Filed: Feb. 24, 2016

(65) Prior Publication Data
US 2016/0245473 A1  Aug. 25, 2016

(30) Foreign Application Priority Data

Feb. 25, 2015 (KR) .................. 10-2015-0026255

(51) Int. Cl.
*F21V 9/00* (2015.01)
*F21S 8/10* (2006.01)

(52) U.S. Cl.
CPC ......... *F21S 48/1241* (2013.01); *F21S 48/225* (2013.01); *F21S 48/2237* (2013.01); *F21S 48/2268* (2013.01); *F21S 48/2281* (2013.01); *F21S 48/215* (2013.01); *F21S 48/328* (2013.01)

(58) Field of Classification Search
USPC ......................................... 362/511
See application file for complete search history.

(56) References Cited

U.S. PATENT DOCUMENTS

| 9,447,940 B2* | 9/2016 | Chen | F21S 48/1241 |
| 2006/0061981 A1* | 3/2006 | Andersen | G02B 6/0006 |
| | | | 362/23.09 |
| 2006/0067084 A1 | 3/2006 | Stefanov | |
| 2006/0256581 A1* | 11/2006 | Hwang | G02B 6/0053 |
| | | | 362/619 |

(Continued)

FOREIGN PATENT DOCUMENTS

| DE | 10029542 A1 | 12/2001 |
| DE | 102004046386 A1 | 4/2006 |

(Continued)

OTHER PUBLICATIONS

Nov. 3, 2016, German Office Action for related DE application No. 102016103010.4.

*Primary Examiner* — Tuyen K Vo
(74) *Attorney, Agent, or Firm* — Paratus Law Group, PLLC

(57) ABSTRACT

A lamp apparatus for an automobile, including: first and second light sources each generating light; and a light guide fully reflecting the light generated by the first light source and the light generated by the second light source and emitting the fully reflected light forward. The light guide includes: a first guide unit with first patterns fully reflecting the light generated by the first light source forward, a second guide unit with second patterns fully reflecting the light generated by the second light source forward, and a third guide unit coupled to the first and second light sources, extending from one end of the first guide unit and one end of the second guide unit, and disposing the first guide unit and the second guide unit orthogonally to each other. The first and second patterns are formed in the third guide unit to cross each other.

9 Claims, 4 Drawing Sheets

(56) References Cited

U.S. PATENT DOCUMENTS

| | | | | |
|---|---|---|---|---|
| 2011/0116286 A1* | 5/2011 | Rudek | ............... | G02B 6/001 |
| | | | | 362/615 |
| 2011/0310327 A1* | 12/2011 | He | ............... | G02B 6/0031 |
| | | | | 349/61 |
| 2012/0020103 A1* | 1/2012 | Okada | ............... | B60Q 1/2607 |
| | | | | 362/510 |
| 2013/0265790 A1* | 10/2013 | Saito | ............... | F21S 48/1241 |
| | | | | 362/511 |
| 2014/0176874 A1* | 6/2014 | Shinohara | ............... | G02B 6/002 |
| | | | | 349/65 |
| 2015/0185396 A1* | 7/2015 | Takagi | ............... | G02B 6/0068 |
| | | | | 362/613 |
| 2015/0185544 A1* | 7/2015 | S | ............... | H05B 33/0845 |
| | | | | 349/58 |

FOREIGN PATENT DOCUMENTS

| | | |
|---|---|---|
| DE | 102005048498 A1 | 4/2007 |
| DE | 102007048762 A1 | 4/2009 |

* cited by examiner

LAMP APPARATUS FOR AUTOMOBILE

CROSS-REFERENCE TO RELATED APPLICATIONS

The present application claims priority to Korean Patent Application Number 10-2015-0026255 filed Feb. 25, 2015, the entire contents of which application is incorporated herein for all purposes by this reference.

TECHNICAL FIELD

The present invention relates to a lamp apparatus for an automobile, and more particularly, to a lamp apparatus for an automobile in which a light guide is installed, which fully reflects light generated by a light source and emits the fully-reflected light to the outside.

BACKGROUND

In general, various lamp apparatuses are mounted at front and rear sides of an automobile to provide safety and driving convenience of the automobile and the lamp apparatuses include a headlamp, a tail lamp, a turn indicator, and the like.

In the lamp apparatus, a light source is exposed when viewed from the outside of the automobile, while according to a recent trend of concentration on design of the automobile a lamp apparatus has been developed, in which a light guide fully reflecting the light generated by the light source and emitting the fully reflected light to the outside of the automobile is installed so that the light source generating light is not directly exposed and an indirect illumination effect is shown. Patterns are formed in the light guide to fully reflect the light generated by the light source through the patterns and emit the fully reflected light to the outside.

When the light guide is made of a flexible material, the light guide can be implemented in various shapes. That is, the light guide may be formed straight with a predetermined length or bent at a predetermined curvature and formed in a curved shape. In addition, a plurality of light guides is installed to implement images having various shapes.

However, up to now, when the light guide is implemented in various shapes so that a part where the patterns cross each other is not generated. The reason is that a lighting image in the part where the patterns cross each other is remarkably different from the lighting images in other parts.

SUMMARY

The present invention has been made in an effort to provide a lamp apparatus for an automobile, in which a light guide has a part where two patterns fully reflecting light cross each other.

Objects of the present invention are not limited to the objects described above, and other objects that are not described will be clearly understood by a person skilled in the art from the description below.

An exemplary embodiment of the present invention provides a lamp apparatus for an automobile, including: a first light source generating light; a second light source generating light; and a light guide fully reflecting the light generated by the first light source and the light generated by the second light source and emitting the fully reflected light forward, wherein the light guide includes a first guide unit with first patterns fully reflecting the light generated by the first light source forward, a second guide unit with second patterns fully reflecting the light generated by the second light source forward, and a third guide unit coupled to the first light source and the second light source, extending from one end of the first guide unit and one end of the second guide unit, and disposing the first guide unit and the second guide unit orthogonally to each other, and the first patterns and the second patterns are formed in the third guide unit to cross each other.

Other detailed contents of the exemplary embodiments are included in the description and drawings.

According to exemplary embodiments of the present invention, since a light guide is formed to have a third guide unit which is a part where first patterns and second patterns cross each other, the light guide can be implemented in various shapes.

As the first patterns are farther from a first light source, an interval between the first patterns gradually decreases and as the second patterns are farther from a second light source, an interval between the second patterns gradually decreases, and as a result, a lighting image of the third guide unit is not remarkably different from the lighting images in other parts, thereby uniformalizing an overall lighting image of the light guide.

The effects of the present invention are not limited to the effects described above, and a person of ordinary skill in the art will clearly understand other effects that are not described from the description of the scope of the claims.

DETAILED DESCRIPTION

Figure 1:
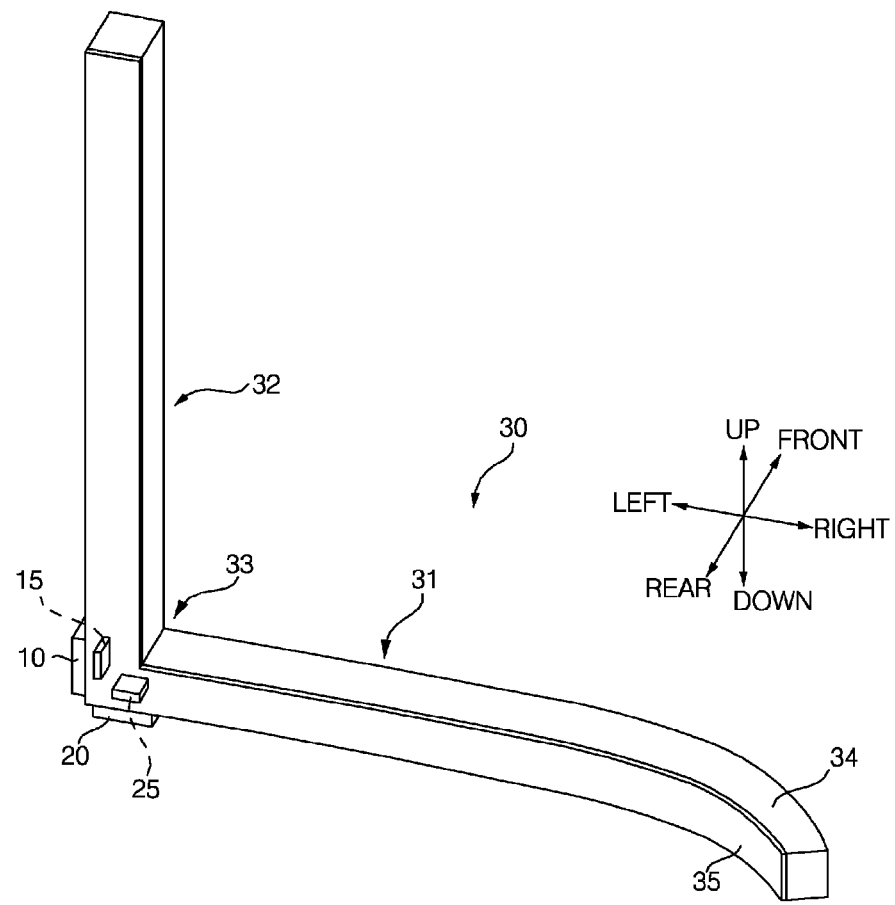
FIG. 1 is a perspective view illustrating a lamp apparatus for an automobile according to a first exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, a lamp apparatus for an automobile according to exemplary embodiments of the present invention will be described with reference to the drawings.

FIG. 1 is a perspective view illustrating a lamp apparatus for an automobile according to a first exemplary embodiment of the present invention.

Referring to FIG. 1, the lamp apparatus for an automobile according to the first exemplary embodiment of the present invention includes a first light source 15 generating light, a second light source 25 generating light, and a light guide 30 fully reflecting the light generated by the first light source 15 and the second light source 25 and emitting the fully reflected light to the outside of a front surface thereof.

Each of the first light source 15 and the second light source 25 is provided as an LED to be mounted on a printed circuit board (PCB). In the exemplary embodiment, it is illustrated that one first light source 15 and one second light source 25 are mounted on PCBs 10 and 20, respectively, but the numbers of first light sources 15 and second light sources 25 mounted may be varied according to the width of the light guide 30.

The first light source 15 and the second light source 25 are buried in the side of the light guide 30, and as a result, the light generated by the first light source 15 and the second light source 25 may be directly incident in the light guide 30 without passing through air.

Of course, the first light source 15 and the second light source 25 are not buried in the light guide 30 but spaced apart from the light guide 30 to be disposed outside the light guide 30. However, when the first light source 15 and the second light source 25 are not disposed outside the light guide 30 but disposed in the light guide 30, a phenomenon in which the light generated by the first light source 15 and the second light source 25 is fully reflected to become extinct while being output into the air may be prevented and an air layer is not present between the first light source 15 and the second light source 25, and the light guide 30, and as a result, a progress medium of the light is decreased and transmittance of the light which is incident in the light guide 30 is improved. Therefore, the first light source 15 and the second light source 25 are preferably disposed in the light guide 30.

The PCBs 10 and 20 are coupled to the side of the light guide 30 while the first light source 15 and the second light source 25 are mounted so that the first light source 15 and the second light source 25 are disposed in the side of the light guide 30. That is, the PCBs 10 and 20 and the light guide 30 are integrally formed, and as a result, an assembly process is simplified as compared with a case in which the PCBs 10 and 20 and the light guide 30 are separately formed.

The PCBs 10 and 20 include a first PCB 10 having the first light source 15 mounted thereon and disposed on the side (a left side in FIG. 1) of the light guide 30 and a second PCB 20 having the second light source 25 mounted thereon and disposed on the bottom of the light guide 30.

The light guide 30 includes a first guide unit 31 fully reflecting the light generated by the first light source 15 and emitting the fully reflected light forward, a second guide unit 32, fully reflecting the light generated by the first light source 15 and emitting the fully reflected light forward, and a third guide unit 33 which extends from one end of the first guide unit 31 and one end of the second guide unit 32 to dispose the first guide unit 31 and the second guide unit 32 orthogonally to each other. The first light source 15 and the second light source 25 are coupled to the third guide unit 33.

The first guide unit 31 extends from the side (a right side in FIG. 1) and the second guide unit 32 extends from the top of the third guide unit 33. Therefore, the light generated by the first light source 15 starts at the left of the third guide unit to be emitted forward while moving up to the right of the first guide unit 31 and the light generated by the second light source 25 starts at the bottom of the third guide unit 33 to be emitted forward while moving up to the top of the second guide unit 32.

The first PCB 10 is disposed on the left of the third guide unit 33, and as a result, the first light source 15 is buried in the third guide unit 33. The second PCB 20 is disposed on the bottom of the third guide unit 33, and as a result, the second light source 25 is buried in the third guide unit 33. Since the PCBs 10 and 20 are coupled to the third guide unit 33 of the light guide 30, when the light guide 30 is mounted on the automobile, the first guide unit 31 and the second guide unit 32 may be mounted to be arbitrarily bent. The light guide 30 is preferably made of a flexible material so that the first guide unit 31 and the second guide unit 32 are mounted on the automobile to be arbitrarily bent.

Of course, the first light source 15 is not buried the third guide unit 33 but disposed to be spaced apart to the left from the third guide unit 33 to radiate the light to the third guide unit 33. In addition, the second light source 25 is not also buried in the third guide unit 33 but disposed to be spaced apart to the bottom from the third guide unit 33 to radiate the light to the third guide unit 33. In this case, the first PCB 10 having the first light source 15 mounted thereon and the second PCB 20 having the second light source 25 mounted thereon are not disposed in the third guide unit 33, of course, but disposed to be spaced apart from the third guide unit 33.

The light guide 30 includes a light emitting unit 34 emitting the light generated by the first light source 15 and the second light source 25 forward and a reflection unit 35 with patterns 37a and 37b disposed in contact with a rear surface of the light emitting unit 34 so that the light emitting unit 34 emits the light forward and fully reflecting the light.

Figure 2:
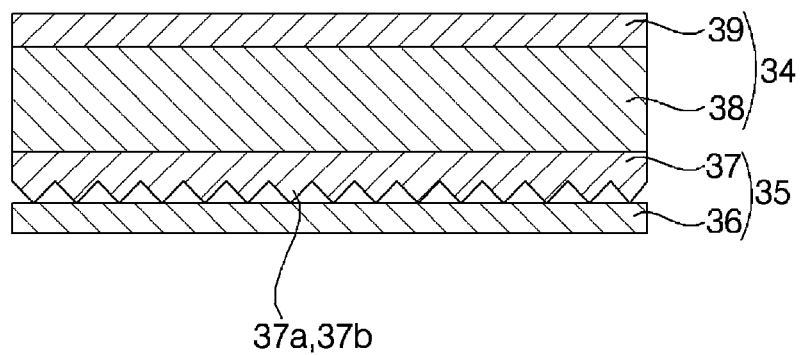
FIG. 2 is a cross-sectional view illustrating a light guide illustrated in FIG. 1.

FIG. 2 is a cross-sectional view illustrating a light guide illustrated in FIG. 1.

Referring to FIGS. 1 and 2, the reflection unit 35 includes a heat dissipating film 36 made of aluminum, which is disposed at the rearmost side and a pattern film 37 disposed in contact with a front surface of the heat dissipating film 36 and having the patterns 37a and 37b.

Since the heat dissipating film 36 has high thermal conductivity, the heat dissipating film 36 is disposed at the rearmost side to dissipate heat generated from the first light source 15 and the second light source 25.

The patterns 37a and 37b protrude on a rear surface of the pattern film 37 toward the heat dissipating film 36 to fully reflect the light generated by the first light source 15 and the second light source 25 forward. That is, the light of the first light source 15 and the second light source 25 which is incident from the side of the light guide 30 is fully reflected to the light emitting unit 34 by the patterns 37a and 37b to be emitted to the front surface of the light emitting unit 34 while being uniform throughout the light guide 30.

The light emitting unit 34 includes a resin layer 38 disposed in contact with the front surface of the pattern film 37 and an outer film 39 disposed in contact with a front surface of the resin layer 38 to protect the resin layer 38.

The resin layer 38 is applied onto the front surface of the pattern film 37 and thereafter, cured through a curer. Before the resin layer 38 is applied onto the front surface of the pattern film 37, the first PCB 10 and the second PCB 20 contact the side of the reflection unit 35 so that the first light source 15 and the second light source 25 are positioned on the top from the front surface of the pattern film 37 and thereafter, the resin layer 38 is applied onto the front surface of the pattern film 37 and the resin layer 38 is cured through the curer, and as a result, the first light source 15 and the second light source 25 are integrally formed with the light guide 30 while the first and second light sources 15 and 25 are buried in the light emitting unit 34.

The resin layer 38 may be made of an ultraviolet (UV) curing resin. The UV curing resin has a higher refractive index and higher thermal conductivity than the air. In the exemplary embodiment, when the air is a reference medium (refractive index=1), each of the first light source 15 and the second light source 25 may adopt an LED having a refractive index of approximately 3 and the resin layer 38 may adopt a UV curing resin having a refractive index of approximately 1.5.

Since the refractive index of the air is 1, when the first light source 15 and the second light source 25 are not disposed in the light guide 30 but outside the light guide 30, a difference between the first light source 15 and the second light source 25, and the air is 2 which is a value acquired by subtracting 1 which is the refractive index of the air from 3 which is the refractive index of the first light source 15 and the second light source 25. In this case, a full-reflectance threshold angle of the light into the air from the first light source 15 and the second light source 25 is approximately 33.9°.

On the contrary, a difference in refractive index between the first light source 15 and the second light source 25, and the resin layer 38 is 1.5 which is a value acquired by subtracting 1.5 which is the refractive index of the resin layer 38 from 3 which the refractive index of the first light source 15 and the second light source 25 and since the difference in the refractive index is small and the full-reflection threshold angle is also large as approximately 52.4 degrees as compared with the case in which the first light source 15 and the second light source 25 are disposed outside the light guide 30, light efficiency may be improved.

Meanwhile, in the light guide 30, the patterns 37a and 37b that fully reflect the light generated by the first light source 15 and the second light source 25 forward are formed in the pattern film 37 as described above. The patterns 37a and 37b will be described below with reference to FIG. 3.

Figure 3:
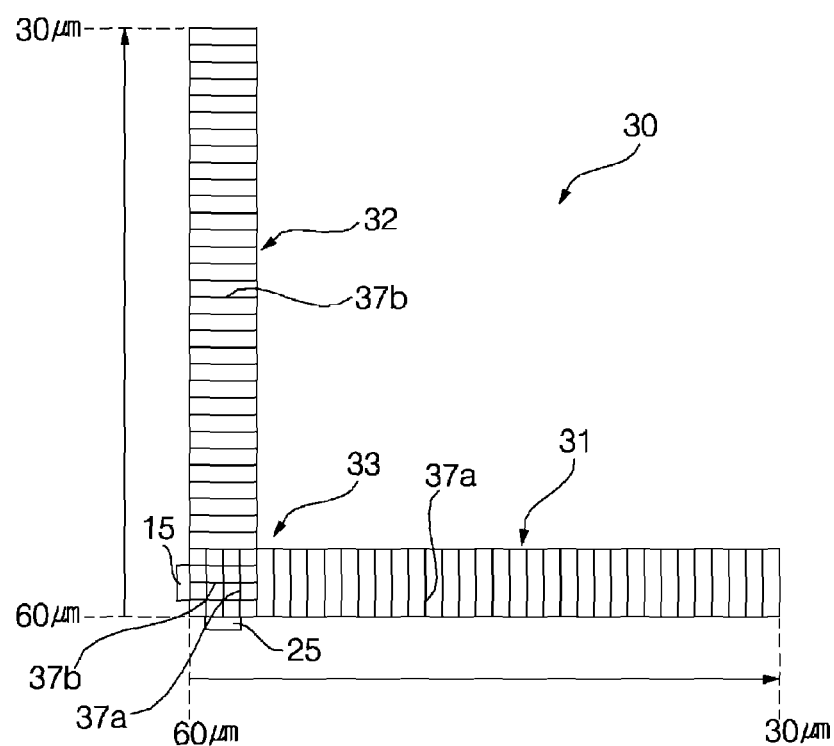
FIG. 3 is a diagram illustrating a pattern formed in the light guide illustrated in FIG. 1.

FIG. 3 is a diagram illustrating a pattern formed in the light guide illustrated in FIG. 1.

Referring to FIG. 3, the patterns 37a and 37b are formed in the light guide 30. The patterns 37a and 37b include first patterns 37a fully reflecting the light generated by the first light source 15 forward and second patterns 37b fully reflecting the light generated by the second light source 25 forward.

The first patterns 37a are formed in the first guide unit 31 and the third guide unit 33. That is, the first patterns 37a are formed from a leftmost side of the third guide unit 33 to a rightmost side of the first guide unit 31 and elongate vertically.

The second patterns 37b are formed in the second guide unit 32 and the third guide unit 33. That is, the second patterns 37b are formed from a lowermost side of the third guide unit 33 to an uppermost side of the second guide unit 32 and elongate horizontally.

Therefore, only the first patterns 37a are formed in the first guide unit 31 and the second patterns 37b are formed in the second guide unit 32, but the first patterns 37a and the second patterns 37b are formed to cross each other in the third guide unit 33. That is, the light guide 30 includes a first guide unit 31 with the first patterns 37a fully reflecting the light generated by the first light source 15 forward, a second guide unit 32 with the second patterns 37b fully reflecting the light generated by the second light source 25 forward, and a third guide unit 33 formed so that the first patterns 37a and the second patterns 37b cross each other.

However, in the light guide 30, since both the first patterns 37a and the second patterns 37b are formed in the third guide unit 33 which is the part where the first guide unit 31 and the second guide unit 32 cross each other, the lighting image of the third guide unit 33 becomes approximately two times brighter than the lighting images of the first guide unit 31 and the second guide 32, and as a result, there is a possibility that an overall lighting image of the light guide 30 will not be uniform.

Therefore, in order to uniformalize the overall lighting image of the light guide 30, as the first patterns 37a are farther from the first light source 15, an interval between the first patterns 37a gradually decreases and as the second patterns 37b are farther from the second light source 25, an interval between the second patterns 37b gradually decreases. In the exemplary embodiment, the interval between the first patterns 37a is 60 μm at a left end of the third guide unit 33 and as the interval gradually decreases toward the right side, the interval is 30 μm at a right end of the first guide unit 31. Further, the interval between the second patterns 37b is 60 μm at a lower end of the third guide unit 33 and as the interval gradually decreases toward the top, the interval is 30 μm from an upper end of the second guide unit 32.

Figure 4:
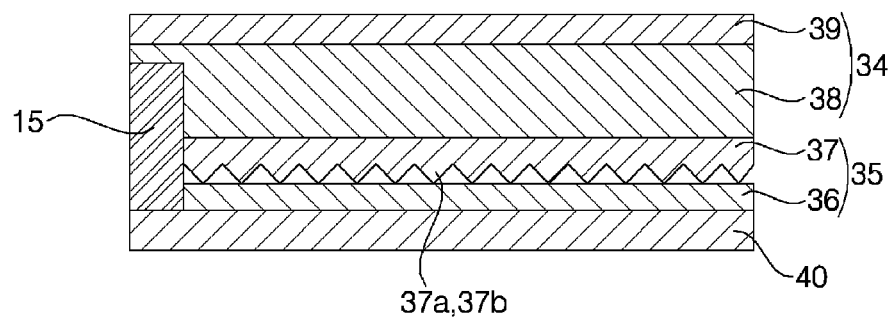
FIG. 4 is a cross-sectional view illustrating a lamp apparatus for an automobile according to a second exemplary embodiment of the present invention.

FIG. 4 is a cross-sectional view illustrating a lamp apparatus for an automobile according to a second exemplary embodiment of the present invention. Herein, like reference numerals refer to like elements in the first exemplary embodiment and the detailed description thereof will be omitted and only a difference will be described.

Referring to FIG. 4, it can be seen that the lamp apparatus for an automobile according to the second exemplary embodiment of the present invention is different from that of the first exemplary embodiment. That is, in the first exemplary embodiment, the light sources 15 and 25 are mounted on the PCBs 10 and 20 and the PCBs 10 and 20 are coupled to the side of the third guide unit 33, but in the second exemplary embodiment, the light sources 15 and 25 (herein, only the first light source 15 is illustrated) are mounted on a flexible printed circuit board (FPCB) 40. In addition, the FPCB 40 is coupled to the rear surface of the heat dissipating film 36 which is an entire rear surface of the light guide 30. As such, when the FPCB 40 is coupled to the rear surface of the light guide 30, the first light source 15 and the second light source 25 are coupled to the rear surface of the third guide unit 33.

In the first exemplary embodiment, it is illustrated that the first light source 15 is coupled to the side of the third guide unit 33 and the second light source 25 is coupled to the bottom of the third guide unit 33, but the first light source 15 and the second light source 25 may be coupled to at least one of the side, the bottom, and the rear surface of the third guide unit 33. For example, both the first light source 15 and the second light source 25 may be coupled to the side of the third guide unit 33, both the first light source 15 and the second light source 25 may be coupled to the bottom of the third guide unit 33, and both the first light source 15 and the second light source 25 may be coupled to the rear surface of the third guide unit 33.

In the second exemplary embodiment, although the FPCB 40 is mounted on the entire rear surface of the light guide 30, when the light guide 30 is mounted on the automobile, the light guide 30 may be mounted to be arbitrarily bent.

As described above, in the lamp apparatus for an automobile according to the present invention, since the light guide 30 has the third guide unit 33 which is the part where the first patterns 37a and the second patterns 37b cross each other, the light guide 30 may be implemented in various shapes.

Further, as the first patterns 37a are farther from the first light source 15, an interval between the first patterns 37a gradually decreases and as the second patterns 37b are farther from the second light source 25, an interval between the second patterns 37b gradually decreases, and as a result, the lighting image of the third guide 33 is not remarkably different from the lighting images of the other parts to uniformalize the overall lighting image of the light guide 30.

Those skilled in the art will be able to understand that the present invention can be easily modified to other detailed forms without changing the technical spirit or an essential feature thereof. Therefore, the aforementioned exemplary embodiments are all illustrative and are not restricted to a limited form. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A lamp apparatus for an automobile, the apparatus comprising:
    a first light source generating light;
    a second light source generating light; and
    a light guide fully reflecting the light generated by the first light source and the light generated by the second light source and emitting the fully reflected light forward,
    wherein the light guide includes:
        a first guide unit with first patterns fully reflecting the light generated by the first light source forward,
        a second guide unit with second patterns fully reflecting the light generated by the second light source forward, and
        a third guide unit coupled to the first light source and the second light source, extending from one end of the first guide unit and one end of the second guide unit, and disposing the first guide unit and the second guide unit orthogonally to each other,
    wherein the first patterns and the second patterns are formed in the third guide unit to cross each other and overlap each other, and
    wherein the first light source, the second light source, and the light guide are arranged such that the light generated by the first light source starts at the third guide unit in a first direction, passes through the third guide unit first in the first direction, enters into the first guide unit in the first direction, and then passes through the first guide unit, and the light generated by the second light source starts at the third guide unit in a second direction orthogonal to the first direction, passes through the third guide unit first in the second direction while orthogonally intersecting the light generated by the first light source in the third guide unit, enters into the second guide unit in the second direction, and then passes through the second guide unit.

2. The apparatus of claim 1, wherein as the first patterns are farther from the first light source, an interval between the first patterns gradually decreases, and
    as the second patterns are farther from the second light source, an interval between the second patterns gradually decreases.

3. The apparatus of claim 1, wherein the first light source and the second light source are buried in the third guide unit.

4. The apparatus of claim 1, wherein the first guide unit extends from the side of the third guide unit, and
    the second guide unit extends from the top of the third guide unit.

5. The apparatus of claim 1, wherein the first light source and the second light source are coupled to at least one of the side, the bottom, and the rear surface of the third guide unit.

6. The apparatus of claim 1, further comprising:
    Printed Circuit Boards (PCBs) on which the first light source and the second light source are mounted, respectively,
    wherein the PCBs are coupled to the third guide unit.

7. The apparatus of claim 1, further comprising:
    Flexible Printed Circuit Boards (FPCBs) on which the first light source and the second light source are mounted, respectively,
    wherein the FPCBs are coupled to a rear surface of the light guide.

8. The apparatus of claim 1, wherein the light guide includes
    a heat dissipating film disposed at a rearmost side,
    a pattern film disposed in contact with a front surface of the heat dissipating film and having the first patterns and the second patterns,
    a resin layer disposed in contact with a front surface of the pattern film, and
    an outer film disposed in contact with a front surface of the resin layer to protect the resin layer.

9. The apparatus of claim 1, wherein the light guide is made of a flexible material.

* * * * *